(12) United States Patent
Motschi et al.

(10) Patent No.: US 9,248,508 B2
(45) Date of Patent: Feb. 2, 2016

(54) ADJUSTABLE CLAMPING DEVICE

(71) Applicant: Schaublin SA, Delémont (CH)

(72) Inventors: Rene Motschi, Delémont (CH); Jean Gabriel Theubet, Delémont (CH)

(73) Assignee: SCHAUBLIN SA, Delémont (CH)

( * ) Notice: Subject to any disclaimer, the term of this patent is extended or adjusted under 35 U.S.C. 154(b) by 0 days.

(21) Appl. No.: 14/345,360

(22) PCT Filed: Sep. 19, 2012

(86) PCT No.: PCT/EP2012/068442
§ 371 (c)(1),
(2) Date: Mar. 17, 2014

(87) PCT Pub. No.: WO2013/041567
PCT Pub. Date: Mar. 28, 2013

(65) Prior Publication Data
US 2014/0346742 A1    Nov. 27, 2014

(30) Foreign Application Priority Data

Jun. 19, 2011    (WO) .................. PCT/EP2011/066211

(51) Int. Cl.
*B23B 31/20*    (2006.01)
*B23B 31/36*    (2006.01)

(52) U.S. Cl.
CPC .................. *B23B 31/20* (2013.01); *B23B 31/36* (2013.01); *B23B 31/201* (2013.01); *B23B 2231/04* (2013.01); *B23B 2231/20* (2013.01); *B23B 2260/056* (2013.01); *Y10T 29/49826* (2015.01); *Y10T 279/17316* (2015.01); *Y10T 279/17529* (2015.01); *Y10T 279/25* (2015.01); *Y10T 279/26* (2015.01); *Y10T 279/3412* (2015.01)

(58) Field of Classification Search
CPC .. B23B 31/20; B23B 31/201; B23B 2231/22; Y10T 279/17529; Y10T 279/17538; Y10T 279/17547; Y10T 279/17495; Y10T 279/17521; Y10T 279/26; Y10T 279/25

USPC ......................................................... 409/233
See application file for complete search history.

(56) References Cited

U.S. PATENT DOCUMENTS

| | | | | |
|---|---|---|---|---|
| 4,943,071 A * | 7/1990 | Srebot | ...................... | B23B 31/16 279/110 |
| 5,193,825 A * | 3/1993 | Kanaan | .................. | B23B 31/026 279/133 |
| 6,598,884 B1 * | 7/2003 | McCluskey | ........... | B23B 31/201 279/51 |
| 7,469,484 B2 * | 12/2008 | Marquart | ................ | B23B 31/36 279/133 |

FOREIGN PATENT DOCUMENTS

| | | |
|---|---|---|
| EP | 2067556 A2 | 6/2009 |
| GB | 860751 A | 2/1961 |
| JP | 2010105121 A | 5/2010 |

OTHER PUBLICATIONS

International Search Report from corresponding PCT Application No. PCT/EP2012/068442, dated Oct. 12, 2012.

* cited by examiner

*Primary Examiner* — Daniel Howell
*Assistant Examiner* — Yasir Diab
(74) *Attorney, Agent, or Firm* — MKG LLC

(57) ABSTRACT

A device for clamping a collet in a machine tool having a rotatable spindle and a spindle nose thereon includes a mounting portion fastenable to the spindle and a clamping portion extending from the mounting portion. A bore is defined through the clamping portion and the mounting portion. At least one moveable ring is located within a portion of the bore defined by the clamping portion, the moveable ring being configured to receive the collet or any other appropriate clamping tool. At least one screw is mounted in the clamping portion and can be tightened against the moveable ring. The collet or clamping tool is attachable to the spindle nose of the machine tool and is drawn into the bore of the clamping portion. A method of clamping a collet includes providing the clamping device, attaching the device to the machine tool, inserting the collet into the clamping device, and attaching the collet to the spindle nose.

24 Claims, 7 Drawing Sheets

ADJUSTABLE CLAMPING DEVICE

TECHNICAL FIELD

The present invention relates generally to collets and other clamping tools, such as but not limited to, expanding arbors, tool holders of various types and similar tooling, and, more particularly, to an adjustable clamping device for minimizing angular clamping error of a collet retained in the adjustable clamping device.

BACKGROUND

A collet is a device having two or more "jaws" between which an object such as a tool or a workpiece can be positioned, the jaws forming a collar around the object. The jaws of the collet are configured to constrict around the object and exert a clamping force. In one type of collet, constriction of the jaws may be effected by pushing a suitable mechanism around the circumference of the collet. In another type of collet called a draw-in collet, the collet is tapered and drawn into a sleeve to cause the jaws to constrict around the tool or workpiece. Collets are typically fabricated from steel, which allows the jaws to be sufficiently flexible relative to each other to facilitate the constriction of the tool or workpiece.

With regard to either type, the collet is held in a clamping device, which is connected to a shaft that can be rotated, which in turn causes the tool or the workpiece to rotate. In instances in which a tool is clamped in the collet and rotated, the tool is made to engage or be engaged by a workpiece. In instances in which the workpiece is clamped in the collet and rotated, the workpiece engages or is engaged by a tool.

The rotational accuracy of the tool or the workpiece affects the process of removing swarf from the workpiece. In particular, the rotational accuracy of the tool or the workpiece is typically a function of concentricity along the axis of rotation. Once clamped into a machine tool such as a lathe or a grinding machine, the tool or workpiece is adjusted to attain concentricity upon rotation. The concentricity achieved with mechanical clamping is often inadequate or compromised during rotation, thereby resulting in runout, which will detrimentally affect the finished workpiece. Concentricity is often adjusted numerous times during an operation of a machine tool.

SUMMARY

In one aspect, the present invention resides in a device for clamping a collet in a machine tool having a rotatable spindle and a spindle nose thereon. The device comprises a mounting portion fastenable to the spindle and a clamping portion extending from the mounting portion. A bore is defined through the clamping portion and the mounting portion. At least one movable ring is located within a portion of the bore defined by the clamping portion, the movable ring being configured to receive the collet. At least one differential screw is mounted in the clamping portion and can be tightened against the movable ring. The collet is attachable to the spindle nose of the machine tool and can be drawn into the bore of the clamping portion and clamped therein.

In another aspect, the present invention resides in an adjustable clamping system for a machine tool. This clamping system comprises collet for holding either a tool or a workpiece and a collet adapter that is locatable on the machine tool. The collet adapter comprises a mounting portion fastenable to a spindle of the machine tool, a clamping portion extending from the mounting portion, and a at least one movable ring located within a bore extending through the mounting portion and the clamping portion. The movable ring is configured to receive the collet therein. At least one differential screw is in communication with the movable ring, the differential screw being adjustable to allow for an adjustment of the position of the collet.

In another aspect, the present invention resides in a method of clamping a collet in a machine tool. This method comprises providing a clamping device defining a bore extending therethrough, the bore including at least one movable ring that is engageable with one or more differential screws. The clamping device is attached to a spindle of the machine tool, and the collet is inserted into the clamping device and held in place at a nose portion defined by the spindle. The collet is then drawn or pushed into the clamping device. The position of the collet can be adjusted using the one or more differential screws.

DETAILED DESCRIPTION

Figure 1:
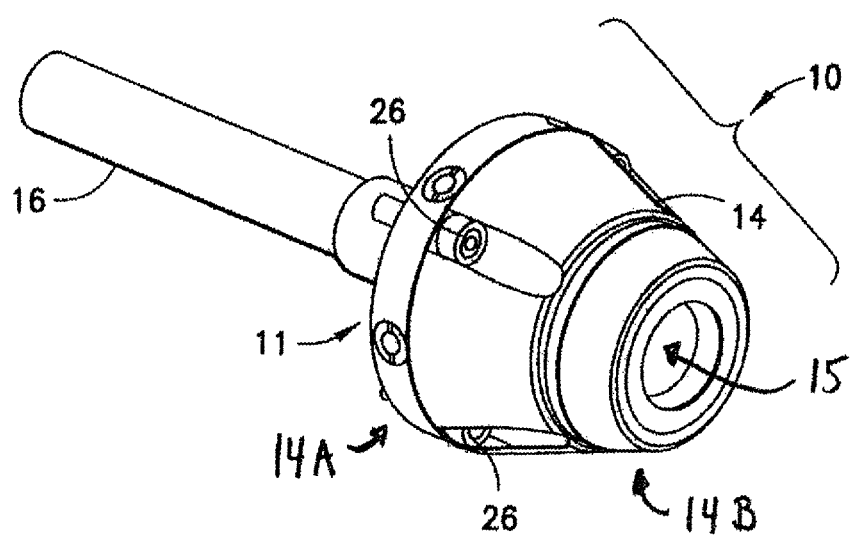
FIG. 1 is a perspective view of a clamping device, of the present invention, suitable for having a collet located therein.

As is shown in FIG. 1, an adjustable device for clamping a collet into a machine tool is designated generally by the reference number 10 and is hereinafter referred to as "collet adapter 10." The collet adapter 10 comprises a mounting portion 11 and a clamping portion 14 extending forward from the mounting portion. The clamping portion 14 is substantially cylindrical, defines a first end 14A proximate to the mounting portion 11 and tapers to a truncated conical configuration at a second end 14B. A bore 15 is defined through the collet adapter 10 and the mounting portion 11 attaches to a spindle (not shown) of the machine tool to effect the rotation of the collet adapter 10.

Figure 2A:
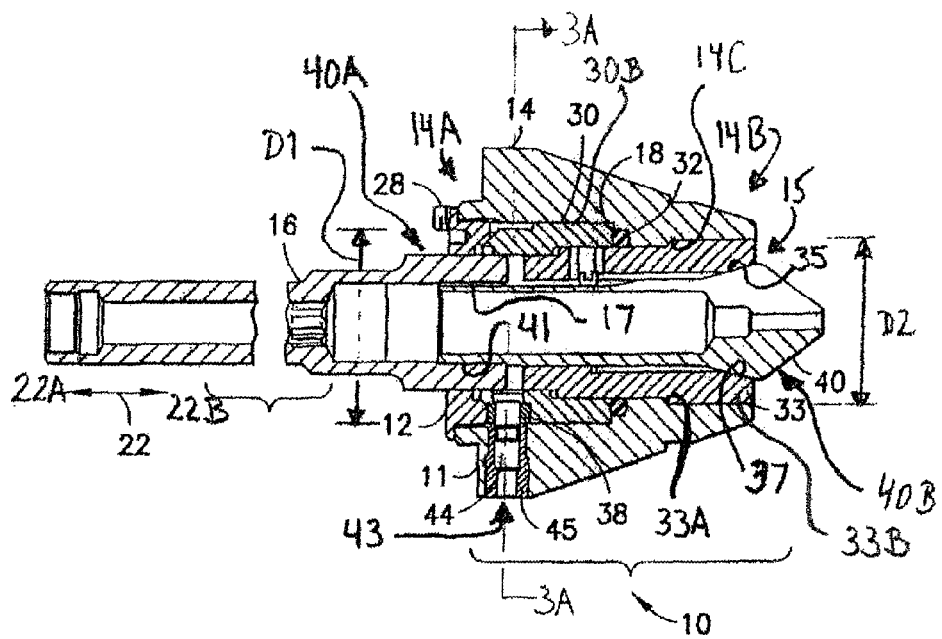
FIG. 2A is side sectional view of the clamping device of FIG. 1.

As is shown in FIG. 2A, the bore 15 is defined through the collet adapter 10 such that a portion of the bore 15 proximate to the first end 14A of the collet adapter 10 having the closing portion 12 is of a first diameter D1 and a portion of the bore 15 proximate the second end 14B having the truncated conical configuration is of a second diameter D2. A shoulder 18 defines a transition between the first diameter D1 and the second diameter D2. The shoulder 18 includes a groove in which an o-ring 32 is located.

The collet adapter 10 is locatable on a spindle of the machine tool such that the bore 15 of the first diameter D1 is located on a compression tool or drawbar 16 of the machine tool which is movable relative to the collet adaptor 10 in opposing directions indicated by an arrow 22; the direction to the left or rearward indicated by 22A and the direction to the right or forward indicated by 22B. Attachment screws 26 (e.g., four attachment screws shown in FIGS. 1 and 3) are used to attach clamping portion 14 to the mounting portion 11. A pin 28 extends from a rearward-facing surface of the mounting portion 11 to facilitate the alignment of the clamping portion 14 for attachment to mounting portion 11.

A first moveable ring 30B referenced to herein as a guide bushing 30 is located in the bore of the first diameter D1 and is positioned to abut the shoulder 18. An outer surface of the guide bushing 30 is positioned against the surface of the bore 15 of the first diameter D1. A second moveable ring 33B referenced to herein as a sleeve 33 is located at least partially in the guide bushing 30 and in the bore 15 of the second diameter D2. As described further below, the first moveable ring 30B and the second moveable ring 33B are moveable, for example, in that they are radially elastically deformable as described with reference to FIGS. 2D, 3A and 3B.

The sleeve 33 is received within the second end 14B of the clamping portion 14 and within the guide bushing 30 at the first end 14A of the clamping portion 14 from the front of the collet adapter 10. A taper 14C located proximate to the second end 14B of the clamping portion 14 expands radially outwardly in the forward direction 22B and slidingly engages a corresponding taper 33A of the sleeve 33 expanding radially outwardly in the forward direction 22B such that movement of the sleeve 33 in the rearward direction 22A beyond the taper 14C is prevented. The sleeve 33 is sized to accommodate the insertion of a collet 40 having an activation end 40A and a clamping end 40B. A clamping taper 35 is defined on an outer surface of the clamping end 40B of the collet 40 and it slidingly engages a corresponding clamping taper 37 defined on an inner surface of the sleeve 33. In the embodiment illustrated in FIG. 2A, the collet 40 has external threads 41 formed proximate to the activation end 40A thereof. Suitable collets 40 can be employed including but not limited to W-type, B-type and L-type collets manufactured by Schaublin SA of Delemont Switzerland.

The collet 40 can be mounted in the collet adapter 10 by being inserted through the second end 14B of the clamping portion 14 into the sleeve 33 that is received in the guide bushing 30 such that the clamping taper 35 of the collet 40 slidingly engages the clamping taper 37 of the sleeve 33. By turning the drawbar 16, external threads 41 of the collet 40 are threaded into internal threads 17 of the drawbar 16. Upon attaching the collet 40 in such a manner, the machine tool is operated such that the drawbar 16 retracts in the rearward direction, thus urging the sliding sleeve taper 37 against the collet taper 35 and causing the collet 40 to be clamped in the truncated conical configuration at the second end 14B of the clamping portion 14.

While the collet 40 is shown and described as having external threads 41 such as W-type, B-type and L-type collets manufactured by Schaublin SA of Delemont Switzerland, the present invention is not limited in this regard as other types of collets may be employed with the adjustable clamping device 10 including but not limited to collets with internal threads and collets having no threads.

Figure 2B:
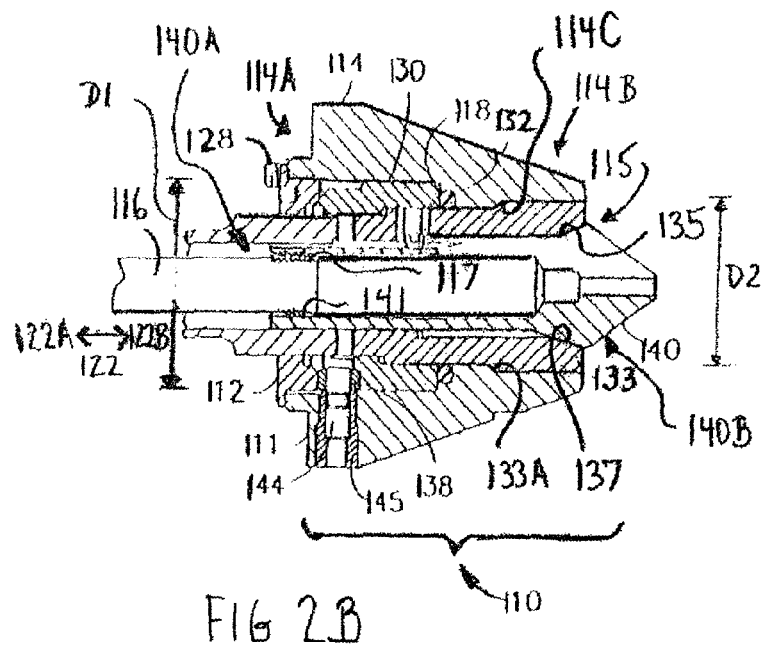
FIG. 2B is a side sectional view of another embodiment of the clamping device of FIG. 1.

An alternate embodiment of a collet adapter 110 is shown in FIG. 2B and is similar to the collet adapter 10 FIG. 2A, thus like element have been assigned like element numbers preceded by the numeral 1. The embodiment of the collet adapter 110 includes a pull-type collet 140 having an activation end 140A and a clamping end 140B, and having internal threads 141 proximate to the activation end 140A thereof. Suitable collets 140 can be employed including but not limited to P-type collets manufactured by Schaublin SA of Delemont Switzerland.

The collet adapter 110 comprises a mounting portion 111 and a clamping portion 114 extending forward from the mounting portion. The clamping portion 114 is substantially cylindrical, defines a first end 114A proximate to the mounting portion 111 and tapers to a truncated conical configuration at a second end 114B. A bore 115 is defined through the collet adapter 110 and the mounting portion 111 attaches to a spindle (not shown) of the machine tool to effect the rotation of the collet adapter 110. The bore 115 is defined through the collet adapter 110 such that a portion of the bore 115 proximate to the end 114A of the collet adapter 110 having the closing portion 112 is of a first diameter D1 and a portion of the bore 115 proximate the opposing end 114B having the truncated conical configuration is of a second diameter D2. A shoulder 118 defines a transition between the first diameter D1 and the second diameter D2. The shoulder 118 includes a groove in which an o-ring 132 is located.

The collet adapter 110 is locatable on a spindle of the machine tool such that the bore 115 of the first diameter D1 is located on a compression tool or drawbar 116 of the machine tool which is movable relative to the collet adaptor 110 in opposing directions indicated by an arrow 122; the direction to the left or rearward indicated by 122A and the direction to the right or forward indicated by 122B. A pin 128 extends from a rearward-facing surface of the mounting portion 111 to facilitate the alignment of the clamping portion 114 for attachment to mounting portion 111 via attachment screws (not shown in FIG. 2B). A guide bushing 130 is located in the bore of the first diameter D1 and is positioned to abut the shoulder 118. An outer surface of the guide bushing 130 is positioned against the surface of the bore 115 of the first diameter D1. A sleeve 133 is located at least partially in the guide bushing 130 and in the bore 115 of the second diameter D2. The sleeve 133 is received within the second end 114B of the clamping portion 114 and within the guide bushing 130 at the first end 114A of the clamping portion 114 from the front of the collet adapter 110. A taper 114C located proximate to the second end 114B of the clamping portion 114 expands radially outwardly in the forward direction 122B and slidingly engages a corresponding taper 133A of the sleeve 133 expanding radially outwardly in the forward direction 122B such that movement of the sleeve 133 in the rearward direction 122A beyond the taper 114C is prevented. The sleeve 133 is sized to accommodate the insertion of the collet 140 wherein a clamping taper 135 is defined on an outer surface of the collet 140 and it slidingly engages a corresponding clamping taper 137 defined on an inner surface of the sleeve 133.

The collet 140 can be mounted in the collet adapter 110 by being inserted through the second end 114B of the clamping portion 114 into the sleeve 133 that is received in the guide bushing 130 such that the clamping taper 135 of the collet 140 slidingly engages the clamping taper 137 of the sleeve 133. By turning the drawbar 116, internal threads 141 of the collet 140 are threaded onto external threads 117 of the drawbar 116. Upon attaching the collet 140 in such a manner, the machine tool is operated such that the drawbar 116 retracts in the rearward direction, thus urging the sliding sleeve taper 137 against the collet taper 135 and causing the collet 140 to be clamped in the truncated conical configuration at the second end 114B of the clamping portion 114.

Figure 2C:
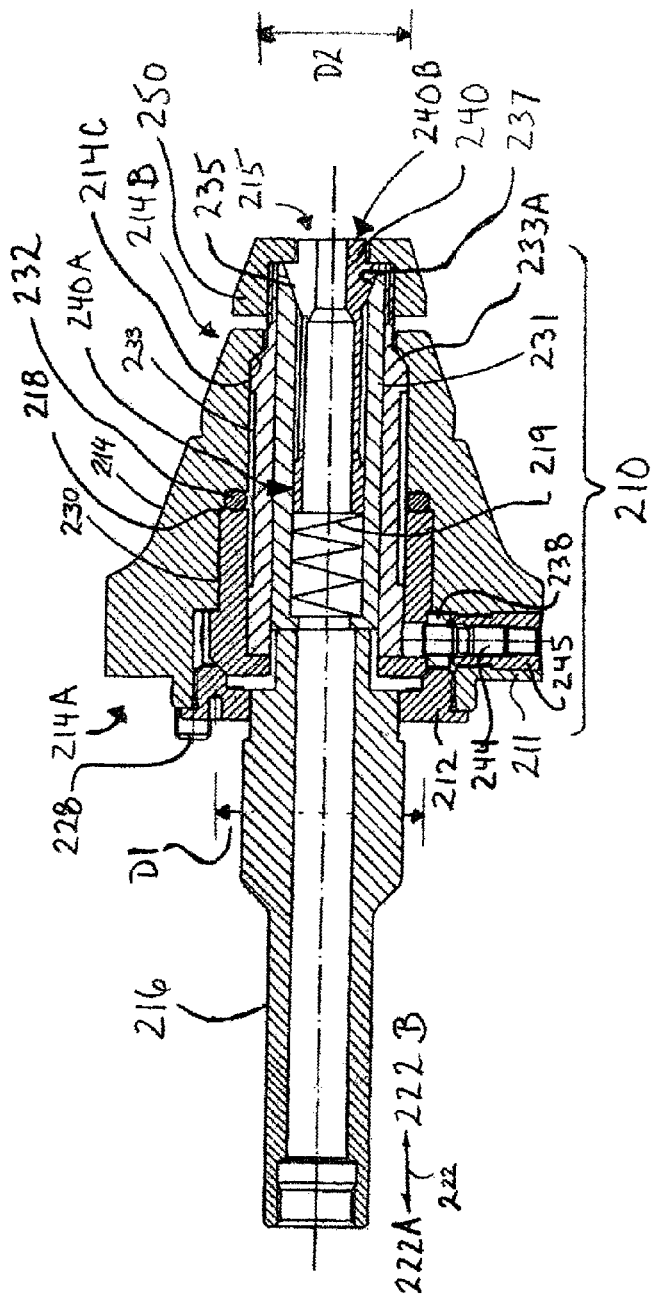
FIG. 2C is a side sectional view of another embodiment of the clamping device of FIG. 1.

Another embodiment of a collet adapter 210 is shown in FIG. 2C and is similar to the collet adapter 10 of FIG. 2A, thus like element have been assigned like element numbers preceded by the numeral 2. The embodiment of the collet adapter 210 includes a dead-length collet 240 having an activation end 240A and a clamping end 240B and having no threads. Suitable collets 240 can be employed including but not limited to F-type collets manufactured by Schaublin SA of Delemont Switzerland.

The collet adapter 210 comprises a mounting portion 211 and a clamping portion 214 extending forward from the mounting portion. The clamping portion 214 is substantially cylindrical, defines a first end 214A proximate to the mounting portion 211 and tapers to a truncated conical configuration at a second end 214B. A bore 215 is defined through the collet adapter 210 and the mounting portion 211 attaches to a spindle (not shown) of the machine tool to effect the rotation of the collet adapter 210. The bore 215 is defined through the collet adapter 210 such that a portion of the bore 215 proximate to the end 214A of the collet adapter 210 having the closing portion 212 is of a first diameter D1 and a portion of the bore 215 proximate the opposing end 214B having the truncated conical configuration is of a second diameter D2. A shoulder 218 defines a transition between the first diameter D1 and the second diameter D2. The shoulder 218 includes a groove in which an o-ring 232 is located.

The collet adapter 210 is locatable on a spindle of the machine tool such that the bore 215 of the first diameter D1 is located on a compression tool or drawbar 216 of the machine tool which is movable relative to the collet adaptor 210 in opposing directions indicated by an arrow 222; the direction to the left or rearward indicated by 222A and the direction to the right or forward indicated by 222B. A pin 228 extends from a rearward-facing surface of the mounting portion 211 to facilitate the alignment of the clamping portion 214 for attachment to the mounting portion 211 via attachment screws (not shown in FIG. 2C). A guide bushing 230 is located in the bore of the first diameter D1 and is positioned to abut the shoulder 218. An outer surface of the guide bushing 230 is positioned against the surface of the bore 215 of the first diameter D1. A first sleeve 233 is located at least partially in the guide bushing 230 and in the bore 215 of the second diameter D2. The sleeve 233 is received within the first end 214A of the clamping portion 214 and within the guide bushing 230 from the rear of the collet adapter 210. A taper 214C located proximate to the second end 214B of the clamping portion 214 expands radially outwardly in the rearward direction 222A and slidingly engages a corresponding taper 233A of the sleeve 233 expanding radially outwardly in the rearward direction 222A such that movement of the sleeve 233 in the forward direction 222A beyond the taper 214C is prevented. A second sleeve 231 is positioned within the first sleeve 233 and the second sleeve 231 is sized to accommodate the insertion of the collet 240 wherein a clamping taper 235 is defined on an outer surface of the clamping end 240B of the collet 240 and it slidingly engages a corresponding clamping taper 237 defined on an inner surface of the second sleeve 231.

The collet 240 can be mounted in the collet adapter 210 by being inserted through the first end 214A of the clamping portion 214 into the second sleeve 231, and the collet 240 is positioned against a compression spring 219. The clamping taper 235 of the collet 240 slidingly engages the clamping taper 237 of the second sleeve 231. Upon positioning the collet 240 in such a manner, a locknut 250 threadedly engages the spindle of the machine tool to retain the collet 240 in its position in the second sleeve 231. The machine tool is operated such that the compression tube 216 pushes the second sleeve 231 in the forward direction 222B further compressing the compression spring 219 and urging the second sleeve taper 237 against the collet taper 235 and the bore 215 wraps around and clamps a workpiece.

Thus the adjustable clamping devices 10, 110 and 210 are selectively adaptable to receiving collets 40 having external threads 41; collets 140 having internal threads 141; or collets 240 being threadless (i.e., having no threads).

The clamping portion 14 defines at least one radial bore 43 extending therethrough in which a threaded insert 45 is positioned, for example, by press fit. Differential screws 44 are located in threaded inserts 45 in the clamping portion 14 and in communication with an adjusting sledge 38 to facilitate the adjustment of the collet 40 clamped in the collet adapter 10. The differential screws 44 are generally located equidistantly around the circumference of the clamping portion 14. The adjusting sledge 38 can be adjusted to center and stabilize the collet 40 in the clamping portion 14 by tightening or loosening the differential screws 44 using a tool such as a screwdriver, a Hex-key or the like. The application of force by the differential screws 44 via the adjusting sledge 38 resiliently deforms the guide bushing 30 acting on sleeve 33 (e.g., in the micrometer range), thus reducing clearance in relation to the bore of the collet adapter 10 and thereby improving repeat accuracy. In certain cases or variants of this invention, the adjusting sledge may be acting directly on sleeve 33.

The differential screws 44 can be made to engage the adjusting sledge 38 via the guide bushing 30 acting on sleeve 33 to compensate for centering and angle errors. By engaging the differential screws 44 with the adjusting sledge 38 (as opposed to allowing the differential screws to directly engage surfaces of the collet 40 when the collet is inserted into the clamping portion), direct contact between the differential screws 44 and the collet is prevented, thus minimizing wear on the collet adapter 10 and the collet. The differential screws 44 are replaceable within the collet adapter 10.

Figure 2D:
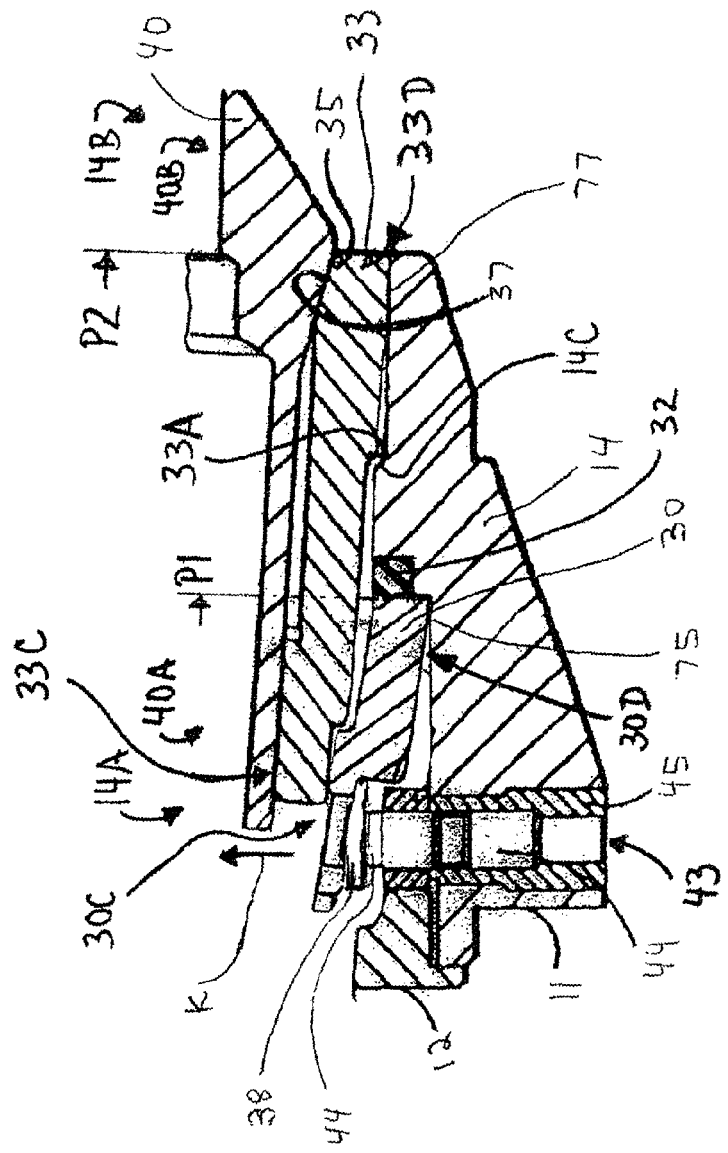
FIG. 2D is an enlarged view of a portion of the clamping device of FIG. 2A shown with the differential screws extended radially inward.

In one embodiment as shown in detail in FIG. 2D, when one or more of the differential screws 44 is extended radially inward in the direction of the arrow K, the differential screws 44 apply a radially inwardly directed force to the adjusting sledges 38, which in turn apply a radially inwardly directed force on a rearward first end of the bushing 30. A forward second end 30D of the bushing 30 is retained between the clamping portion 14 and the sleeve 33 at a first axial position P1. The first end 30C of the bushing 30 applies a radially inwardly directed force on a rearward first end 33C of the sleeve 33. A forward second end 33D of the sleeve 33 is retained to a portion of the clamping portion 14 at a second axial position P2 between the collet 40 and the clamping portion 14. Thus a portion of the bushing 30 proximate the first end 30C and a portion of the sleeve 33 proximate the first end 33C are caused to elastically deform radially inward and engage the collet 40 for radially adjustment of the collet 40.

Figure 3A:
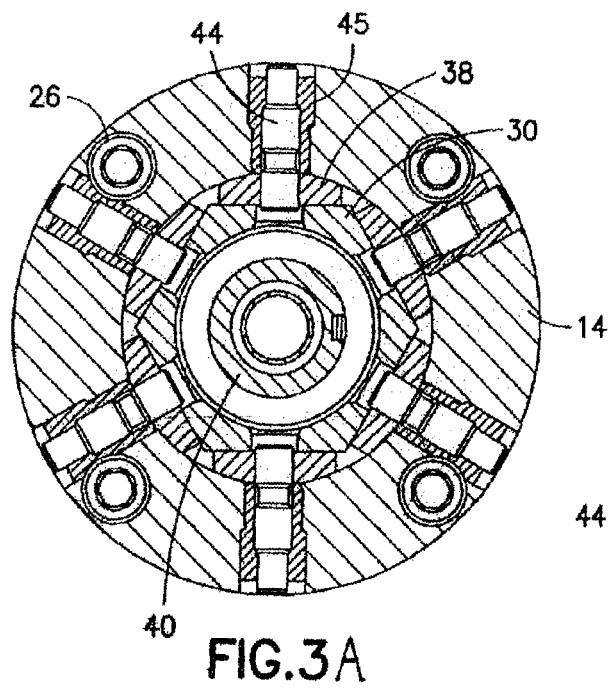
FIG. 3A is a sectional view of the clamping device of FIG. 1 taken along line 3A of FIG. 2A.
Figure 3B:
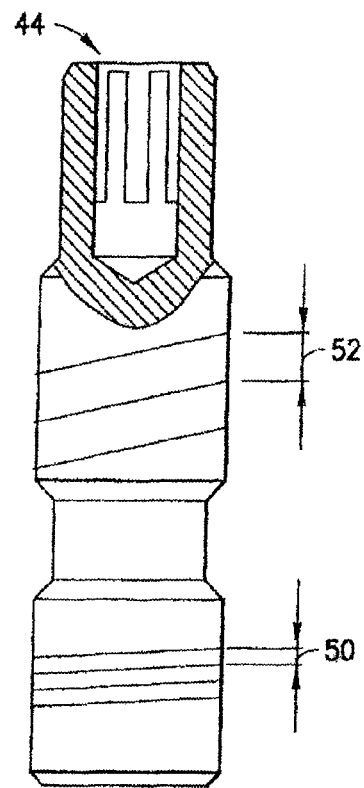
FIG. 3B is a side sectional view of a differential screw of the clamping device of FIG. 1 showing thread pitches.
Figure 4:
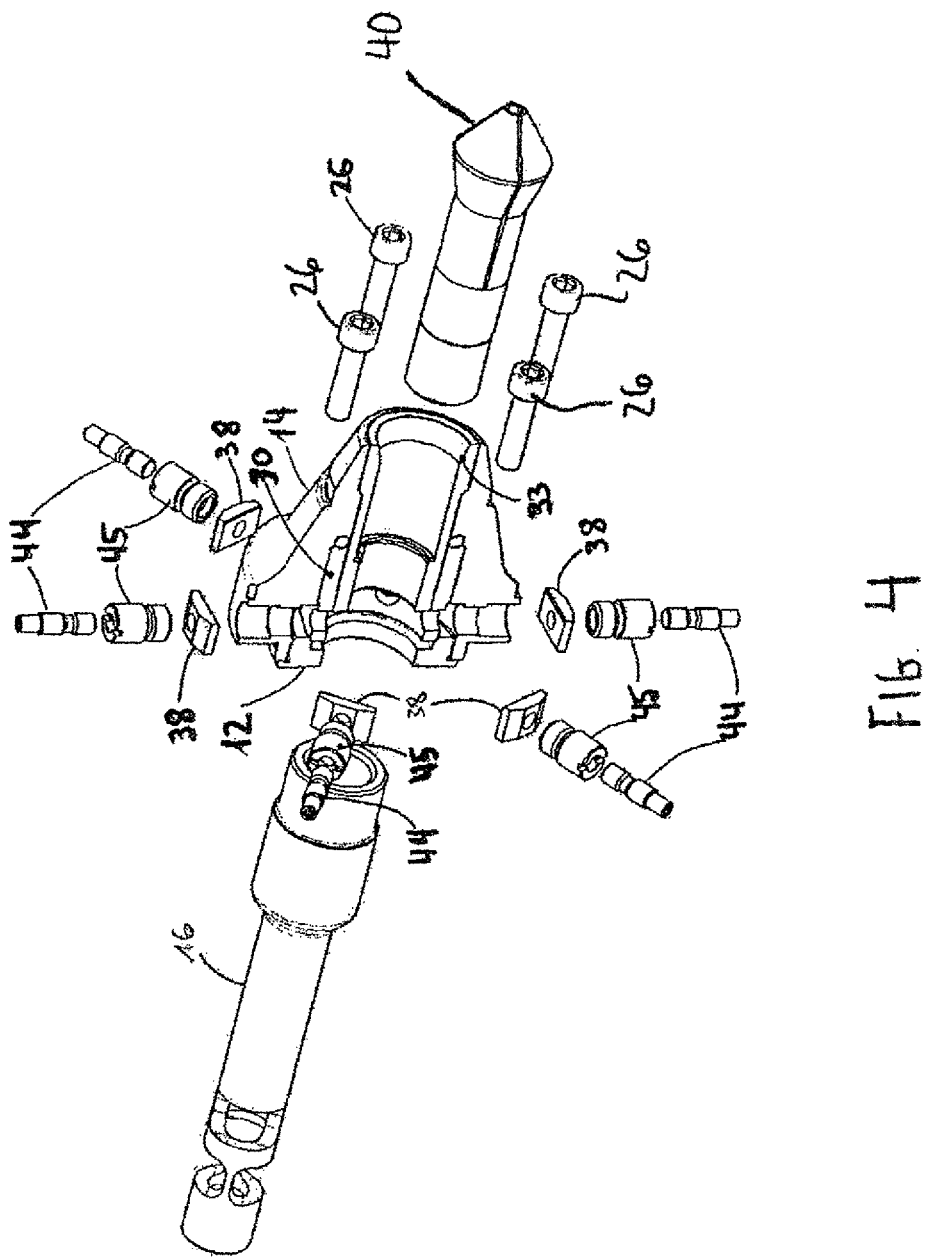
FIG. 4 is an exploded perspective view of the clamping device of FIG. 1.

As is shown in FIGS. 3A, 3B and 4, six differential screws 44 in the threaded insert 45 are located equidistantly around the circumference of the clamping portion 14. However, it should be understood that the present invention is not so limited. For example, additional (or fewer) differential screws may be located around the circumference of the clamping portion. Furthermore, the differential screws 44 may be aligned along the length of the clamping portion in an axial direction to allow for the adjustment of the angle of a tool or workpiece in the collet 40 or for compensating for error due to excessive (or shorter) length of the tool, the workpiece, or the collet. It should also be noted that although four attachment screws 26 are equidistantly located around the mounting plate 11 of the collet adapter 10, the present invention is not so limited as additional (or fewer) attachment screws may be used.

As is shown in more detail in FIG. 3B, each of the differential screws 44 incorporates two different thread pitches, namely, a first thread pitch 50 and a second thread pitch 52. The difference between the first thread pitch 50 and the second thread pitch 52 gives the radial correction per rotation. The closer the first thread pitch 50 is to the second thread pitch 52, the finer the possible adjustment of the differential screw 44 is. Because of the two different thread pitches, the friction produced in the threads allows for the differential screws 44 to be self locking.

Referring now to FIGS. 1-4, rotational adjustment of a tool or workpiece clamped in the collet 40 is performed by adjusting the differential screws 44, thereby moving the differential screws in or out of the clamping portion 14. In an unclamped position, i.e. where the differential screws 44 are not engaging guide bushing 30 via the adjusting sledge 38, the differential screws can be turned in a narrow range with slight resistance, and the guide bushing 30 can be freely adjusted within the available tolerance. By adjusting the differential screws 44 inward, the differential screws engage the adjusting sledge 38, friction and resistance increase, the guide bushing 30 and the sleeve 33 and the collet 40 inserted therethrough are held in place, and the adjustment is thereby stabilized. To ensure that the adjustment is stabilized, the differential screws 44 engage the guide bushing 30 under either tension or compression stress.

In addition to the fine possible rotational adjustment, it is also possible to compensate for larger rotational concentricity irrespective of the original accuracy of the clamping device (e.g., trued attachment of the mounting portion 12 to the spindle of the machine tool). Likewise the collet adapter 10 permits wear to be compensated and can thus considerably increase the service life of clamping devices. Adjustment of the collet 40 via the differential screws 44 can be performed with a tool or workpiece clamped in the collet prior to processing of the workpiece or between two processing phases. Readjustment is possible at any time without the removal of individual components such as the collet adapter 10, the collet 40, or the tool or workpiece.

In the collet adapter 10, consideration may be given during the design thereof to permitting or preventing the passage of coolants, lubricants, flushing agents, or the like. Depending on the application in which the collet adapter 10 is used, the collet adapter 10 may be configured to provide free access for cleaning purposes or sealed variants that prevent dirt from entering.

Also, the components of the collet adapter 10 can be fabricated using different materials depending on the application in which the collet adapter is to be used. For example, various types of metals and alloys may be used. Metals that may be used to fabricate the collet adapter 10 include, but are not limited to, titanium and nickel. Alloys that may be used include steels such as hardenable steels, non-hardenable steels, stainless steels, and low-corrosion steels. Other alloys are also within the scope of the present invention. Various materials and coatings may be applied and used to improve surface properties. Likewise materials and coatings used in the chemical and foodstuffs industries may be used.

The collet adapter 10 of the present invention can be employed in any suitable machine tool application. Suitable machine tool applications include, but are not limited to, tool grinding machines for volume production and regrinding operations, grinding machines, lathes and automatic lathes for high precision manufacturing using the main spindle and sub-spindles of such lathes, transfer machines, and dividing attachments, tailstocks, spindle noses, and other clamping devices.

Figure 5:
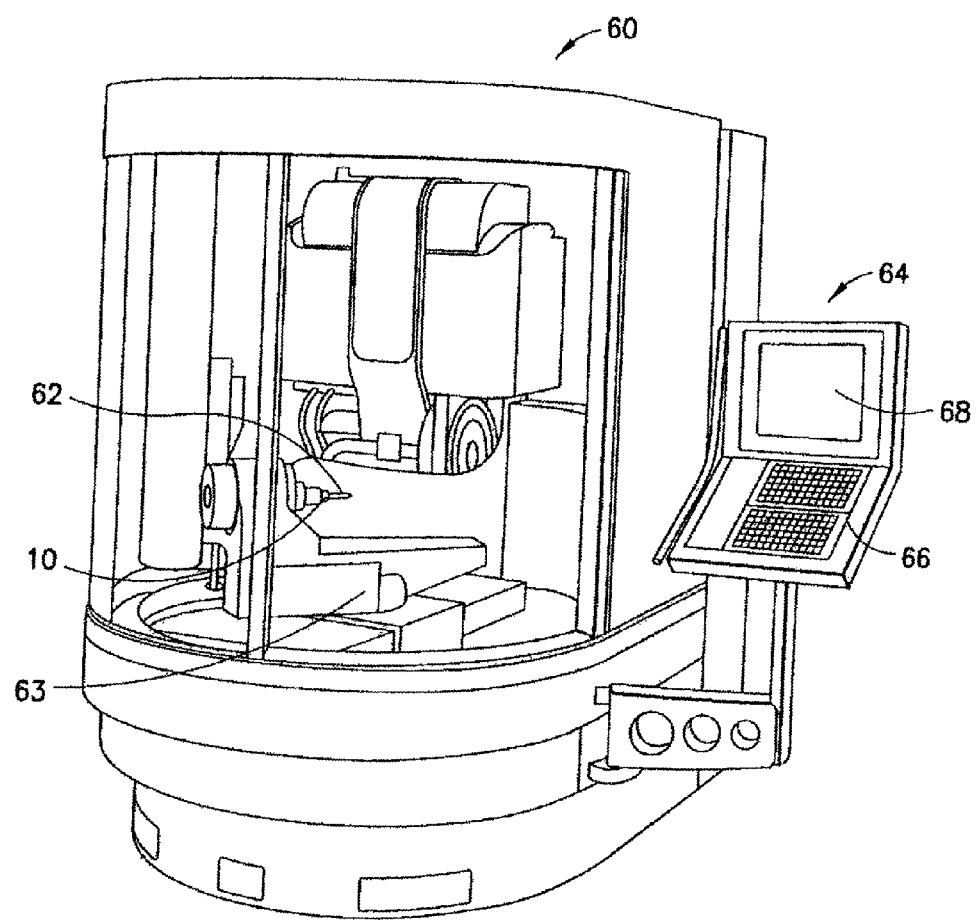
FIG. 5 is one exemplary embodiment of an automated grinding machine incorporating the clamping device of FIG. 1.

As is shown in FIG. 5, one exemplary type of machine tool application is an automated grinding machine 60 in which the collet adapter 10 is used to hold a workpiece 62. The workpiece 62 is movable via movement of a table 63, carriage, carousel, or arm to which the tool is attached. The movement of the table 63 is controllable using a programmable logic circuit 64 (PLC 64) such as a computer. The PLC 64 incorporates a keypad 66 through which an operator can interface with the PLC 64 and a display screen 68 on which data can be viewed. By interacting with the PLC 64 using the keypad 66, the operator can program movements of the workpiece 62 and control the action thereof As described above, a device for clamping a tool or a workpiece according to the present invention includes a mounting portion 11 fastenable to a spindle of a machine tool, a clamping portion 14 extending from the mounting portion 11, and the clamping portion 14 and the mounting portion 11 define a bore 15 extending therethrough. At least one moveable ring 30B is located within a portion of the bore 15 defined by the clamping portion 14. The moveable ring 30B is configured to receive a collet 40 and at least one differential screw 44 is in communication with the moveable ring 30B. The collet 40 is attached via the device to a spindle nose of the machine tool and is drawn into the bore 15 of the clamping portion 14 and clamped therein.

The device for clamping a tool or a workpiece further includes a sleeve 33 located intermediate the moveable ring 30B and an inner surface of the portion of the bore 15 defined through the clamping portion 14. The bore 15 defined through the clamping portion 14 is defined by a first diameter D1 and a second diameter D2, and wherein a transition between the first diameter D1 and the second diameter D2 is a shoulder 18. A bushing 30 is located intermediate the movable ring 30B and an inner surface of the portion of the bore 15 defined by the first diameter D1 and abutting the shoulder 18. At least one differential screw 44 includes at least two different thread pitches and the differential screw 44 is located in a threaded insert 45.

The collet 40, 140 is threadedly attached to a pulling device 16 of the machine tool. The collet 40 defines an activation end 40A and a clamping end 40B wherein the activation end 40A has external threads 41. The collet 140 defines an activation end 140A and a clamping end 140B wherein the activation end 140A has internal threads 141. The collet 240 defines an activation end 240A and a clamping end 240B with the activation end 240A being threadless.

An adjustable clamping system for a machine tool according to the present invention includes a collet 40 for holding one of a tool and a workpiece, and a collet adapter 10 locatable on the machine tool. The collet adapter 10 includes a mounting portion 11 fastenable to a spindle of the machine tool and a clamping portion 14 extending from the mounting portion 11. The clamping portion 14 and the mounting portion 11 define a bore 15 extending therethrough. A moveable ring 30B) and a sleeve 33 are located within the bore 15, and the moveable ring 30B is resiliently deformable and configured to receive the collet 40 therein. At least one differential screw 44 is in communication with the moveable ring 30B, and the differential screw 44 is adjustable to allow for an adjustment of the position of the collet 40. The machine tool is configured to draw the collet 40 into the clamping portion 14.

The adjustable clamping system further includes a sleeve 33 located intermediate the moveable ring 30B and an inner surface of a portion of the bore 15 defined through the clamping portion 14. The differential screw 44 includes two different thread pitches. The mounting plate is fastenable to the spindle of the machine screw via a plurality of attachment screws 26. The collet 40 defines an activation end 40A and a clamping end 40B wherein the activation end 40A has external threads 41. The collet 140 defines an activation end 140A and a clamping end 140B wherein the activation end 140A has internal threads 141. The collet 240 defines an activation end 240A and a clamping end 240B with the activation end 240A being threadless.

A method of clamping a collet in a machine tool according to the present invention includes providing a clamping device defining a bore 15 extending therethrough. The bore 15 includes at least one moveable ring 30B that is engageable with one or more differential screws 44. The clamping device is attached to a spindle of the machine tool. The collet 40 is inserted into the clamping device, attached to a pulling device 16 of the spindle of the machine tool, and drawn into the clamping device. The position of the collet 40 is adjusted using one or more of the differential screws 44.

The clamping device is attached to the spindle of the machine tool by truing a mounting portion 11 to the spindle to adjust rotational concentricity of the clamping device. Adjusting the position of the collet 40 includes adjusting one or more differential screws 44 to engage the moveable ring 30B located around the collet 40 and keep the differential screw(s) 44 under one of tension or compression stress. An activation end 40A having external threads 41 is attached to a pulling device of the spindle of the machine tool. An activation end 140A having internal threads 141 is attached to a pulling device of the spindle of the machine tool. Lastly, an activation end 240A being threadless is attached to a pulling device of the spindle of the machine tool.

Another device for clamping a tool or a workpiece according to the present invention includes a clamping portion 14 defining an axial bore 15 extending therethrough and at least one radial bore 43 extending therethrough. At least one adjusting sledge 38 is located within a portion of the axial bore 15 and a differential screw 44 is axially movable with the radial bore 43 and in communication with the adjusting sledge 38. A bushing 30 is disposed in the axial bore 15 and engages the adjusting sledge(s) 38. A sleeve 33 is disposed in the bore 15 radially inward of and engaging a portion of the bushing 30. The bushing 30 is radially movable at a first end 30C in response to radial movement of the adjusting sledge 38 and is radially restrained at a second end 30D between the clamping portion 14 and the sleeve 33 at a first axial position P1. The sleeve 33 is radially moveable at a first end 33C in response to radial movement of the bushing 30 and is radially restrained at a second end 33D to a portion of the clamping portion 14 at a second axial position P2.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A device for clamping a tool or a workpiece, the device comprising:
   a mounting portion fastenable to a spindle of a machine tool;
   a clamping portion extending from the mounting portion, the clamping portion and the mounting portion defining a bore extending therethrough;
   a collet attached via the device to a spindle nose of the machine tool,
   a guide bushing located within a portion of the bore defined by the clamping portion,
   a sleeve located at least partially in the guide bushing and in the bore, and being configured to receive the collet; and
   a plurality of differential screws positioned equidistant circumferentially around the clamping portion in communication with the guide bushing;
   wherein the collet is drawn into the bore of the clamping portion and clamped therein.

2. The device of claim 1, wherein the portion of the bore defined through the clamping portion is defined by a first diameter and a second diameter, and wherein a transition between the first diameter and the second diameter is a shoulder.

3. The device of claim 1, wherein each of the differential screws includes at least two different thread pitches.

4. The device of claim 3, further comprising a threaded insert in which one of the differential screws is located.

5. The device of claim 1, wherein the collet is threadedly attached to a pulling device of the machine tool.

6. The device of claim 1, wherein the collet defines an activation end and a clamping end wherein the activation end has one of external threads, internal threads, and being threadless.

7. The device of claim 1, wherein the plurality of differential screws comprises six differential screws.

8. The device of claim 1, further comprising a plurality of adjustment sledges, wherein the plurality of differential screws apply a radially inwardly directed force to the plurality of adjustment sledges which in turn apply a radially inwardly directed force on a rearward first end of the guide bushing.

9. The device of claim 1, wherein the guide bushing is resiliently deformable.

10. The device of claim 8, wherein the guide bushing is resiliently deformable.

11. An adjustable clamping system for a machine tool, the clamping system comprising:
    a collet for holding one of a tool and a workpiece;
    a collet adapter locatable on the machine tool, the collet adapter comprising,
    a mounting portion fastenable to a spindle of the machine tool;
    a clamping portion extending from the mounting portion, the clamping portion and the mounting portion defining a bore extending therethrough;
    a guide bushing and a sleeve located within the bore, the guide bushing being resiliently deformable, the sleeve being configured to receive the collet therein; and
    a plurality of differential screws positioned equidistant circumferentially around the clamping portion and in communication with the guide bushing, each of the plurality of differential screws being adjustable to allow for an adjustment of the position of the collet.

12. The adjustable clamping system of claim 11, wherein the machine tool is configured to draw the collet into the clamping portion.

13. The adjustable clamping system of claim 11, wherein each of the plurality of differential screws includes two different thread pitches.

14. The adjustable clamping system of claim 11, wherein the mounting portion is fastenable to the spindle of the machine screw via a plurality of attachment screws.

15. The adjustable clamping system of claim 11 wherein the collet defines an activation end and a clamping end wherein the activation end has one of external threads, internal threads, and being threadless.

16. The adjustable clamping system of claim 11, wherein the plurality of differential screws comprises six differential screws.

17. The adjustable clamping system of claim 11, further comprising a plurality of adjustment sledges, wherein the plurality of differential screws apply a radially inwardly directed force to the plurality of adjustment sledges which in turn apply a radially inwardly directed force on a rearward first end of the guide bushing.

18. A method of clamping a collet in a machine tool, the method comprising the steps of:
    providing a clamping device defining a mounting portion and a clamping portion, a bore extending therethrough, and a guide bushing that is engageable with a plurality of differential screws positioned equidistant circumferentially around the clamping portion;
    providing a plurality of adjustment sledges;
    attaching the clamping device to a spindle of the machine tool;
    inserting the collet into the clamping device and attaching the collet to a pulling device of the spindle of the machine tool;
    drawing the collet into the clamping device; and
    adjusting a position of the collet using one or more of the plurality of differential screws.

19. The method of claim 18, wherein attaching the clamping device to the spindle of the machine tool comprises truing the mounting portion to the spindle to adjust rotational concentricity of the clamping device.

20. The method of claim 18, wherein adjusting a position of the collet includes adjusting the one or more of the plurality of differential screws to engage the guide bushing located around the collet and keeping the one or more of the plurality of differential screws under one of tension or compression stress.

21. The method of claim 18, wherein attaching the collet to a pulling device of the spindle of the machine tool comprises attaching an activation end having one of external threads, internal threads, and being threadless, to a pulling device of the spindle of the machine tool.

22. The method of claim 18, wherein the step of providing a plurality of differential screws further comprises providing six differential screws positioned equidistant circumferentially around the clamping portion.

23. The method of claim 18, wherein the guide bushing is resiliently deformable.

24. A device for clamping a tool or a workpiece, the device comprising:
    a clamping portion defining an axial bore extending therethrough and at least one radial bore extending therethrough;
    at least one adjusting sledge located within a portion of the axial bore;
    a differential screw axially movable with the at least one radial bore and in communication with the adjusting sledge;
    a bushing disposed in the axial bore and engaging the at least one adjusting sledge;
    a sleeve disposed in the bore radially inward of and engaging a portion of the at least one bushing;
    the bushing being radially movable at a first end in response to radial movement of the adjusting sledge and being radially restrained at a second end between the clamping portion and the sleeve at a first axial position; and
    the sleeve being radially moveable at a first end in response to radial movement of the at least one bushing and being radially restrained at a second end to a portion of the clamping portion at a second axial position.

\* \* \* \* \*